United States Patent
Kai et al.

(10) Patent No.: US 7,586,414 B2
(45) Date of Patent: Sep. 8, 2009

(54) RADIO TAG

(75) Inventors: Manabu Kai, Kawasaki (JP); Hiroyuki Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 28 days.

(21) Appl. No.: 11/415,749

(22) Filed: May 2, 2006

(65) Prior Publication Data

US 2006/0208901 A1    Sep. 21, 2006

Related U.S. Application Data

(63) Continuation of application No. PCT/JP2004/002377, filed on Feb. 27, 2004.

(51) Int. Cl.
G08B 13/14    (2006.01)

(52) U.S. Cl. .................. 340/572.7; 340/572.8; 341/22; 343/846; 343/848; 343/858; 343/700 MS; 235/492

(58) Field of Classification Search ............. 340/572.7, 340/572, 572.8; 235/492; 343/846, 848; 343/858, 700 MS; 341/22
See application file for complete search history.

(56) References Cited

U.S. PATENT DOCUMENTS

| | | | |
|---|---|---|---|
| 6,243,013 B1 | 6/2001 | Duan et al. | |
| 6,563,463 B1 | 5/2003 | Saito | |

2003/0193437 A1    10/2003    Kangasvieri et al.

FOREIGN PATENT DOCUMENTS

| | | | |
|---|---|---|---|
| EP | 1 055 943 | | 11/2000 |
| EP | 1 401 050 | | 3/2004 |
| JP | 5-143799 | | 6/1993 |
| JP | 2000-332523 | | 11/2000 |
| JP | 2000-339422 | | 12/2000 |
| JP | 2001-101365 | | 4/2001 |
| JP | 2002151945 | A  * | 5/2002 |
| JP | 2002-183695 | | 6/2002 |
| JP | 2003-085515 | | 3/2003 |
| JP | 2005-51161 | | 2/2005 |
| WO | 04/001894 | | 12/2003 |

OTHER PUBLICATIONS

Supplementary European Search Report dated Oct. 1, 2007, from the corresponding European Application.
Notification of Reason(s) for Refusal dated Apr. 15, 2008, from the corresponding Japanese Application.
Notification of Reason(s) for Refusal issued on Aug. 12, 2008, from the corresponding Japanese Application.

* cited by examiner

*Primary Examiner*—Benjamin C Lee
*Assistant Examiner*—Sisay Yacob
(74) *Attorney, Agent, or Firm*—Katten Muchin Roseman LLP

(57) ABSTRACT

In a noncontact type radio tag communicating with an RFID reader/writer, a first planar antenna is arranged on one surface of a dielectric substrate, a ground plane with which a second planar antenna is integrally formed is arranged on the other surface of the dielectric substrate, and an IC chip is connected to the first and the second planar antenna with a feeder.

4 Claims, 6 Drawing Sheets

FIG.4

|  | OBJECT<br>ATTACHED SURFACE | METAL | | NONMETAL | |
|---|---|---|---|---|---|
|  |  | ATTACHABILITY/<br>NON-ATTACHABILITY | DIRECTIVITY | ATTACHABILITY/<br>NON-ATTACHABILITY | DIRECTIVITY |
| PRIOR ART RFID TAG 400 | GROUND 8 | ○ | SIGNAL S1 ONLY (FIG.7A) | ○ | SIGNAL S1 ONLY (FIG.7C) |
|  | PATCH ANTENNA 2 | × | — (FIG.7B) | ○ | SIGNAL S2 ONLY (FIG.7D) |
| RFID TAGS 100 & 200 OF PRESENT INVENTION | GROUND 8 | ○ | SIGNAL S1 ONLY (FIG.7A) | ○ | SIGNAL S1 & SIGNAL S2 (FIG.2A) |
|  | PATCH ANTENNA 2 | × | — (FIG.7B) | ○ | SIGNAL S1 & SIGNAL S2 (FIG.2B) |

300 RFID TAG

400 RFID TAG

PRIOR ART

RADIO TAG

CROSS-REFERENCE TO RELATED APPLICATION

This application is a continuation of International Application PCT/JP2004/002377 filed on Feb. 27, 2004, the contents of which are herein wholly incorporated by reference.

BACKGROUND OF THE INVENTION

1. Field of the Invention

The present invention relates to a radio tag, and in particular to a noncontact type radio tag communicating with an RFID reader/writer.

2. Description of the Related Art

In recent years, an RFID (Radio Frequency IDentification) system identifying/managing objects by unique information stored in an IC chip has been actively developed. In the RFID system, an RFID reader/writer transmits a high-frequency electric wave signal. A radio tag provided with the IC chip having stored therein the unique information receives the electric wave signal, and then transmits the unique information to the RFID reader/writer.

For example, by attaching radio tags to commercial products such as books and clothes, it is made possible to read the unique information of the radio tag attached to the commercial products by using the RFID reader/writer, or reversely write the unique information in the radio tag.

The radio tag is generally composed of the IC chip and an antenna. When a high-frequency signal is received by the antenna, a rectifier portion embedded in the IC chip converts the high-frequency signal into a DC component on the order of 3 V, for example, so that the signal can be processed by the electric power thereof and further transmitted through the antenna.

As for the frequency of the signal, not only 13.56 MHz but also higher frequencies such as 900 MHz and 2.45 GHz have been used recently.

FIG. 5 shows an example of an RFID tag as a generally used radio tag. An RFID tag 300 in FIG. 5 is composed of a dipole antenna 11 of a plane circuit type having a length of $\lambda/2$ and an IC chip 6.

Depending on the shape of the dipole antenna 11 and the chip power consumption in the IC chip 6, if the transmission signal power from the RFID reader/writer (not shown) or the radio tag is on the order of 1 W, the RFID reader/writer and the radio tag have a communicable distance on the order of 1 m.

As for other prior art radio tags, there is one in which a semiconductor chip storing information of an object to be identified, a first antenna capable of receiving and transmitting the information of the semiconductor chip between a receiving/transmitting apparatus provided externally, and a second antenna operable by receiving an electric wave of a frequency different from that of the first antenna are integrated (see e.g. patent document 1).

This has integrated an identification tag and an antitheft tag, for example, to improve convenience in handling.

Also, there is another in which two radio tags whose axial directions of cylindrical antenna coils are arranged almost orthogonal with each other and are mutually fixed by a fixing means, thereby relieving directional restriction of transmission/reception sensitivity when the axial directions of the cylindrical antenna coils are arranged almost parallel to the affixing surface of the affixing member (see e.g. patent document 2).

This has enabled a signal transmission/reception by avoiding influences of a conductive member by utilizing a leaked electric wave even when an object to which a radio tag is attached is a conductive member such as a metal having influence on communication and power transfer of a radio tag by generating magnetic flux in the opposite direction for attenuating the original magnetic flux by an eddy current.

Moreover, there is a radio tag capable of transmitting/receiving a signal even if the radio tag is embedded in a conductive member such as a metal (see e.g. patent document 3).

(Patent Document 1) Japanese Patent Application Laid-open No.2000-339422

(Patent Document 2) Japanese Patent Application Laid-open No.2002-183695

(Patent Document 3) Japanese Patent Application Laid-open No.2003-85515

The above-mentioned patent documents 2 and 3 resolve a problem in a case where an object to which the radio tag is attached is a conductive member such as a metal. Specifically, the above-mentioned patent document 3 discloses a radio tag capable of transmitting/receiving a signal even if it is embedded in a metal or the like.

However, it has been known that a radio tag using a patch antenna may be used for merely attaching a tag to a surface of a metal or the like.

FIG. 6 shows an RFID tag 400 using a patch antenna 2 as such an example. The RFID tag 400 has the square patch antenna 2 whose side has a length of $\lambda/2$ on the top surface of a dielectric substrate 1 as shown in FIG. 6. Also, on the undersurface thereof, a ground 8 is formed all over the surface and functions as a ground of the patch antenna 2.

The patch antenna 2 is connected to the IC chip 6 through a microstrip line 3 provided on the same surface, and is fed with electric power from the IC chip 6 through the microstrip line 3. Also, the IC chip 6 is connected to the ground 8 on the undersurface through a through hole 7.

For the RFID tag 400 in FIG. 6, if the surface to which the patch antenna 2 is not attached, i.e. the ground 8 of the undersurface is attached to a metallic object, the ground 8 and the metallic object assume the same electric potential, so that the electric potential of the patch antenna 2 itself does not change and therefore its input impedance does not change. Thus, the RFID tag 400 can be attached to the metallic object to be used.

FIGS. 7A and 7B schematically show how an electric wave is received in this case. As shown in FIG. 7A, when the surface of the ground 8 is attached to a metallic object 20, a signal S1 arriving at the surface of the patch antenna 2 can be received by the patch antenna 2. As a matter of course, since a signal S2 arriving at the surface of the ground 8 is intercepted and reflected by the metallic object 20, it cannot be received.

Contrarily, as shown in FIG. 7B, when the surface of the patch antenna 2 is attached to the metallic object 20, the patch antenna 2 itself is connected to the electric potential of the metallic object 20, so that not only its input impedance changes, but also the signal S1 is reflected since the ground 8 is metallic. Namely, when the surface of the patch antenna 2 is attached to the metallic object 20, neither the signal S2 arriving at the side of the patch antenna 2 nor the signal S1 arriving at the surface of the ground 8 can be received.

Therefore, in case of the RFID tag 400, it is required that the side of the ground 8 is attached to the metallic object 20 without fail as shown in FIG. 7A and that transmission and reception of an electric wave are enabled only in the direction of the top surface where the patch antenna 2 is attached (direction of signal S1 in FIG. 7A).

Also, when the object to which the RFID tag 400 is attached is nonmetallic, the patch antenna 2 or the ground 8 may be attached to the object. However in this case, the electric wave from the direction incident on the ground 8 is reflected by the metallic ground 8.

FIGS. 7C and 7D schematically show how a signal is received in cases where the RFID tag 400 is attached so that the ground 8 and the patch antenna 2 may respectively touch a nonmetallic object 30.

In either case, although both of the signals S1 and S2 have reached the RFID tag 400, when the ground 8 is attached to the nonmetallic object 30 as shown in FIG. 7C, the signal S1 shown can be received by the patch antenna 2 but the signal S2 is reflected by the ground 8 and cannot be received. Contrarily, when the patch antenna 2 is attached to the nonmetallic object 30 as shown in FIG. 7D, the signal S2 shown can be received by the patch antenna 2 but the signal S1 is reflected by the ground 8 and cannot be received.

In contrast, the above-mentioned RFID tag 300 shown in FIG. 5 has a problem that when it is attached to a metallic object the input impedance of the dipole antenna 11 is largely changed, so that the communication distance is extremely shortened or the communication is completely disabled. However, if the object to be attached is not metallic, the RFID tag 300 has a directivity in all directions except null directions A and B.

Therefore, the RFID tag 300 is more suitable than the RFID tag 400 when it is attached to a nonmetallic object.

Supposing a case where metallic objects and nonmetallic objects coexist as the objects to which the radio tags are attached, if it is not desired to limit the directivity of the radio tags to be attached to the nonmetallic objects to only one direction, the preparation of two types of radio tags, for example, the RFID tag 400 in FIG. 6 and the RFID tag 300 in FIG. 5, respectively for the metallic objects and the nonmetallic objects is required.

In this case, it is required to identify whether or not the object to be attached is metallic at the time of attachment. If the RFID tag 300 for the nonmetallic object is attached to the metallic object by mistake, the communication distance will be extremely shortened or the communication will be completely disabled as mentioned above.

Contrarily, if the RFID tag 400 for the metallic object is attached to the nonmetallic object, the transmission/reception of the electric wave for only one surface can be performed as shown in FIGS. 7C and 7D regardless of whether the attached surface is the patch antenna 2 or the ground 8, so that there is a problem that the directivity in overall directions (except null direction) expected for the RFID tag 300 for the nonmetallic object which should have been originally attached cannot be obtained.

Also, it is possible to use e.g. the RFID tag 400 of FIG. 6 if one type of radio tag is commonly used for the metallic object and the nonmetallic object. However, there is a problem that in this case, the directivity of the RFID tag 400 when it is attached to the nonmetallic object is relatively weak compared to that of the RFID tag 300 of FIG. 5 as mentioned above.

SUMMARY OF THE INVENTION

It is accordingly an object of the present invention to provide a radio tag which improves the directivity of transmitting/receiving an electric wave when a radio tag for both of a metal and a nonmetal is attached to a nonmetallic object.

In order to achieve the above-mentioned object, a radio tag according to the present invention comprises: a first planar antenna arranged on one surface of a dielectric substrate; a second planar antenna formed integrally with a ground plane arranged on the other surface of the dielectric substrate; and an IC chip connected to the first and the second planar antenna through a feeder.

Namely, a first planar antenna is arranged on one surface of a dielectric substrate, a second planar antenna formed integrally with a ground plane is arranged on the other surface of the dielectric substrate, and an IC chip is connected to the first and the second planar antenna with a feeder.

Thus, when an object to which the radio tag is attached is a metal, by attaching the ground plane to the metal that is the object in the same way as in the prior art, an electric wave can be transmitted/received through the first planar antenna since there is no change in input impedance of the first planar antenna.

Also, when the object to which the radio tag is attached is a nonmetal, either of the first and the second planar antenna may be attached. The electric wave can be received through the first planar antenna when the arriving direction of the electric wave is in the first planar antenna or through the second planar antenna when the arriving direction of the electric wave is in the second planar antenna, thereby realizing the signal transmission/reception of the IC chip through the feeder.

Thus, by the above-mentioned radio tag for both of the metal and the nonmetal, the directivity of the electric wave transmission/reception when it is attached to the nonmetallic object is improved.

While the surface to be attached to the nonmetallic object may be either of the surfaces of the first or the second planar antenna as mentioned above, by deciding the surface to be attached to the side of the ground plane, it becomes unnecessary to check whether or not the object is the metal.

The above-mentioned first planar antenna may comprise a patch antenna and the above-mentioned second planar antenna may comprise a slot antenna.

Also, the above-mentioned feeder may comprise a microstrip line or a coplanar line.

The frequencies of electric wave signals transmitted and received by the above-mentioned first planar antenna and the above-mentioned second planar antenna may be the same.

The above-mentioned IC chip may be placed on the same surface as the first planar antenna and may be connected to the ground plane through a through hole provided in the dielectric substrate.

The above-mentioned feeder may be placed on the same surface as the first planar antenna and may be connected electromagnetically to the second planar antenna through a noncontact feeding portion.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 4 is a diagram for comparing characteristics of a prior art radio tag and a radio tag according to the present invention;

DESCRIPTION OF THE EMBODIMENTS

Embodiment (1)

Feeder Composed of Microstrip Line

Figure 1:
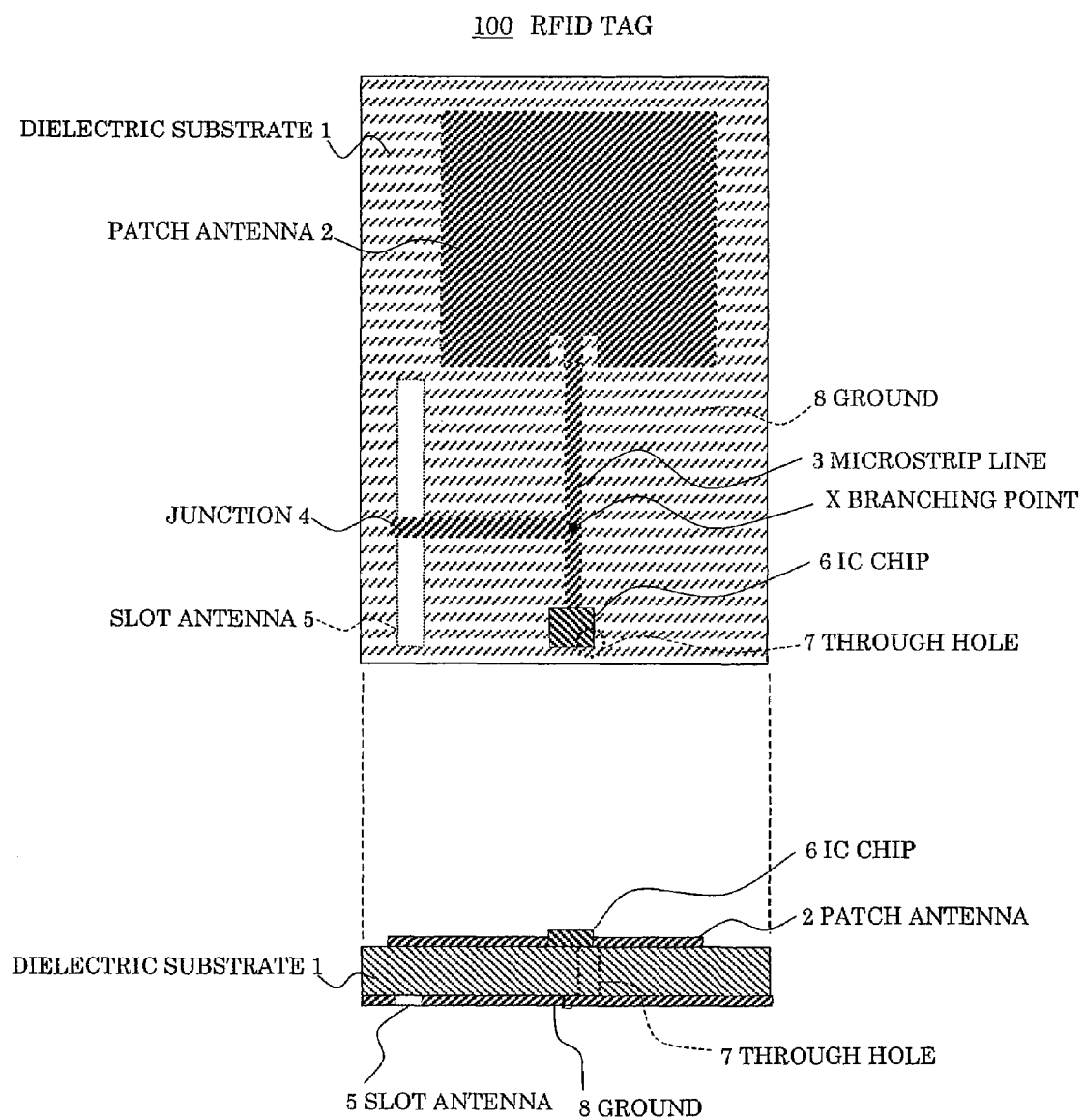
FIG. 1 is a diagram showing an embodiment (1) of a radio tag according to the present invention.

FIG. 1 shows an RFID tag 100 as an embodiment (1) of the present invention where a feeder is composed of a microstrip line 3.

Figure 6:
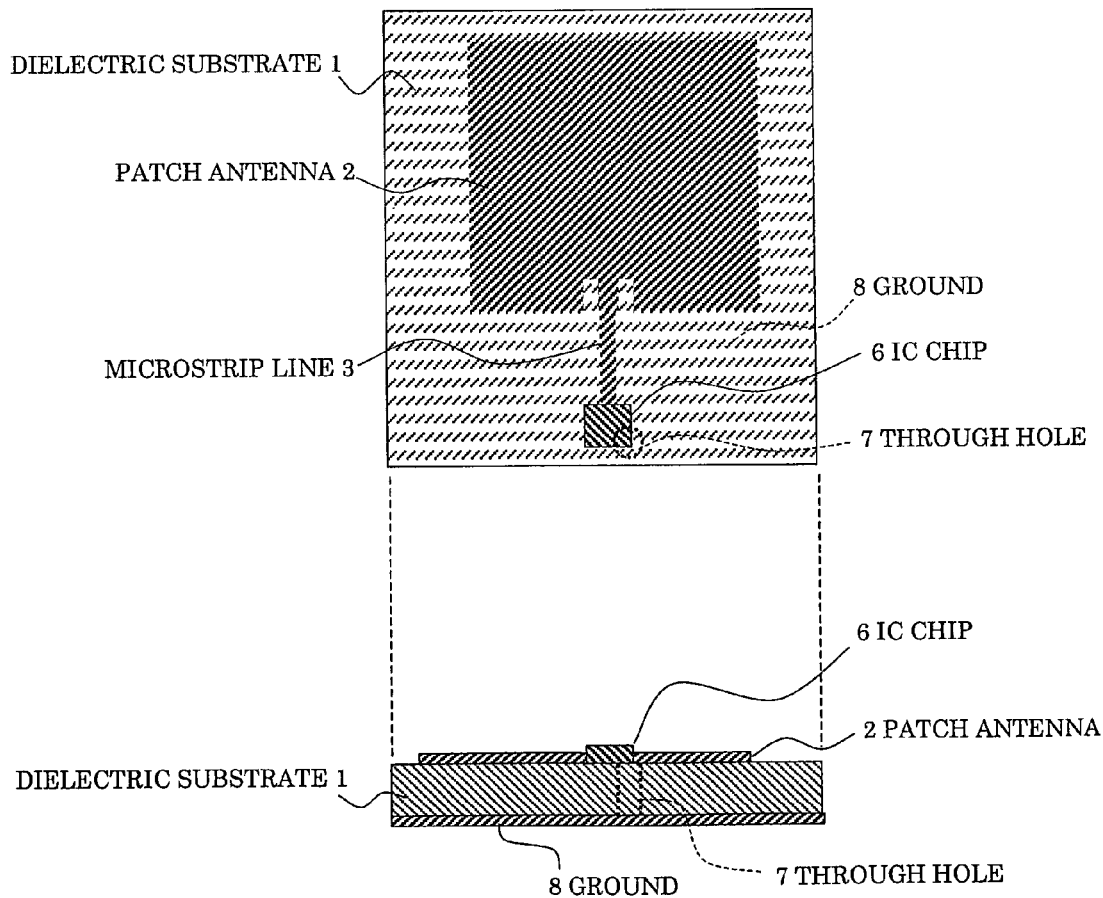
FIG. 6 is a diagram showing a prior art radio tag using a patch antenna.

The RFID tag 100 of FIG. 1 has a square patch antenna 2 whose side has a length of λ/2 on the top surface of a dielectric substrate 1 in the same way as the prior art RFID tag 400 shown in FIG. 6. Also, on the undersurface thereof, a ground 8 is formed all over the surface, and functions as a ground of the patch antenna 2.

The patch antenna 2 is connected to the IC chip 6 through the microstrip line 3 provided on the same surface. The patch antenna 2 is fed with electric power from the IC chip 6 through the microstrip line 3. Also, the IC chip 6 is connected to the ground 8 on the undersurface through a through hole 7.

The RFID tag 100 is different from the prior art RFID tag 400 in that a slot antenna 5 having the same transmission/reception frequency as that of the patch antenna 2 is formed within the ground 8 as shown in FIG. 1. Also, the microstrip line 3 that connects the IC chip 6 to the patch antenna 2 is branched at a branching point X as shown in FIG. 1 and electromagnetically coupled to the slot antenna 5 on the undersurface by a junction 4.

In a case where the RFID tag 100 is attached to a metallic object, by attaching the surface of the ground 8 to the metallic object an electric wave signal can be transmitted to and received from an RFID reader/writer (not shown) through the patch antenna 2.

The manner how an electric wave signal is received in this case is the same as that in the case of the prior art RFID tag 400. As having been shown in FIG. 7A, the signal S1 arriving on the side of the patch antenna 2 can be received when the side of the ground 8 is attached to the metallic object 20. Even when the RFID tag 100 is used, the signal S2 arriving on the side of the ground 8 is reflected by the metallic object 20, so that the signal S2 cannot be received as in the prior art.

In a case where the RFID tag 100 is attached to a nonmetallic object, either surface may be attached, whereby the electric wave signal can be transmitted and received between the RFID reader/writer from either surface. Namely, when the RFID reader/writer is facing the patch antenna 2, the communication with the RFID reader/writer can be performed through the patch antenna 2. When the RFID reader/writer is contrarily facing the ground 8, the communication with the RFID reader/writer can be performed through the slot antenna 5.

The manner how the signal is received in this case will now be described referring to FIGS. 2A and 2B.

Figure 2A:
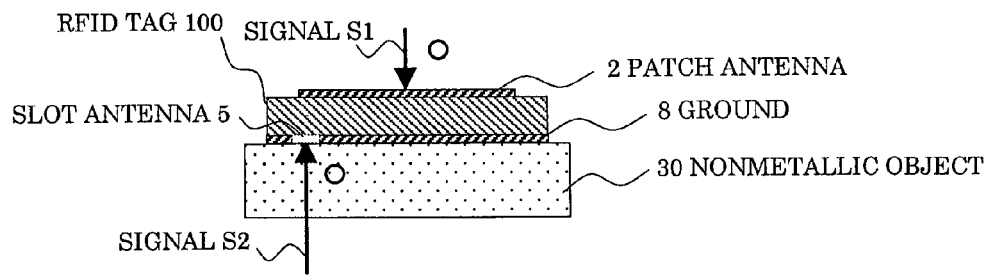
FIGS. 2A and 2B are sectional diagrams for describing an effect of a radio tag according to the present invention.
Figure 7A:
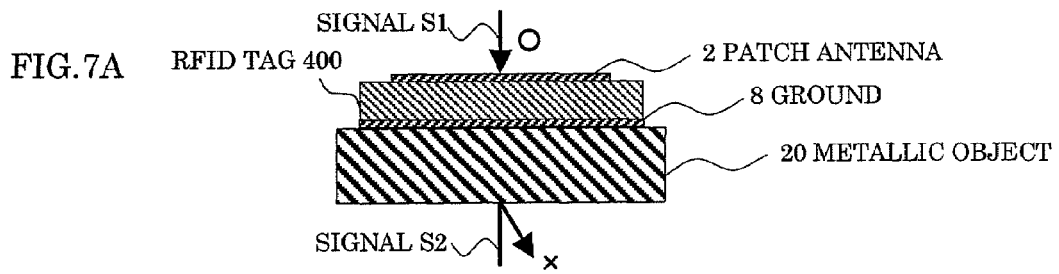
FIGS. 7A-7D are sectional diagrams schematically showing how a signal is received when the RFID tag 400 of FIG. 6 is attached to a metallic and a nonmetallic object.
Figure 7B:
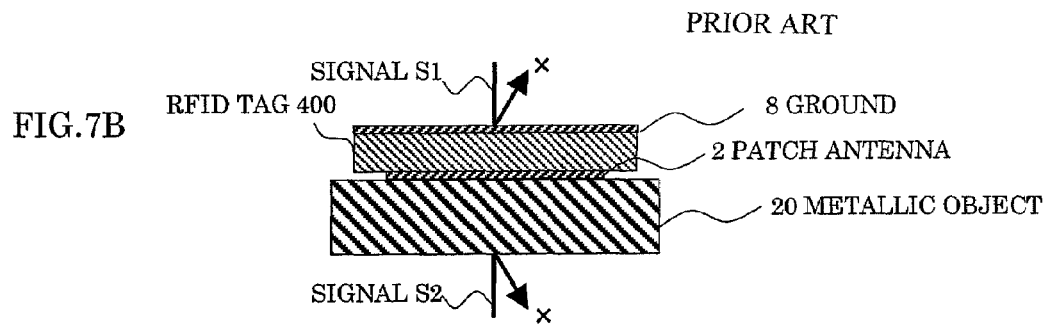
Figure 7C:
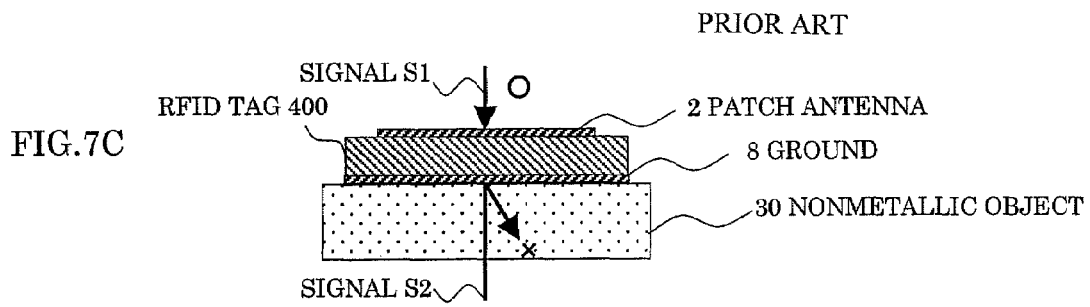

FIG. 2A, corresponding to FIG. 7C showing the prior art RFID tag 400, shows a state in which both of the signals S1 and S2 are receivable when the ground 8 is attached to the nonmetallic object 30. Namely, in the case where the prior art RFID tag 400 is used as having been shown in FIG. 7C, the signal S2 is reflected by the ground 8, and cannot be received. However, by using the RFID tag 100 as shown in FIG. 2A, the signal S2 can be received from the slot antenna 5 formed on the ground 8.

Figure 2B:
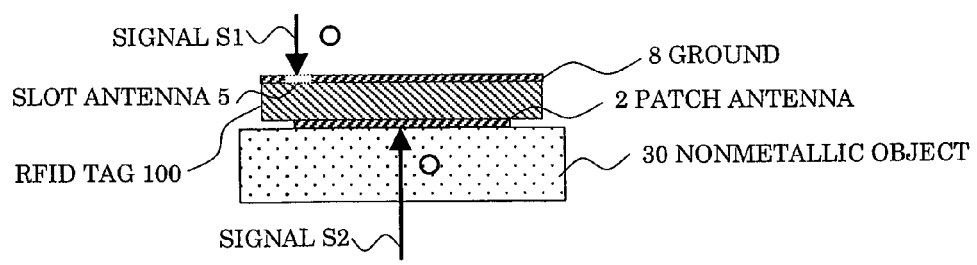
Figure 7D:
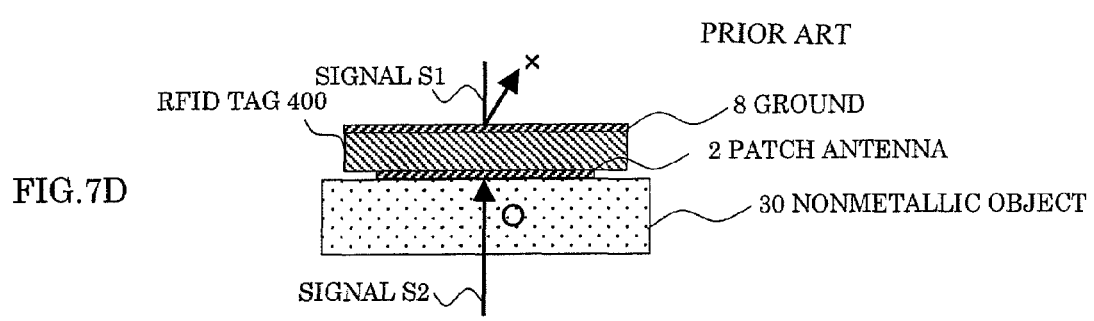

FIG. 2B, corresponding to FIG. 7D showing the prior art RFID tag 400, shows a state in which both of the signals S1 and S2 are receivable when the patch antenna 2 is attached to the nonmetallic object 30. Namely, in the case where the prior art RFID tag 400 is used as having been shown in FIG. 7D, the signal S1 is reflected by the ground 8, and cannot be received. However, by using the RFID tag 100 as shown in FIG. 2B, the signal S1 can be received from the slot antenna 5 formed on the ground 8.

Thus, the directivity of electric wave transmission/reception is improved compared with the prior art when the object to which the tag is attached is a nonmetal.

Embodiment (2)

Feeder Composed of Coplanar Line

Figure 3:
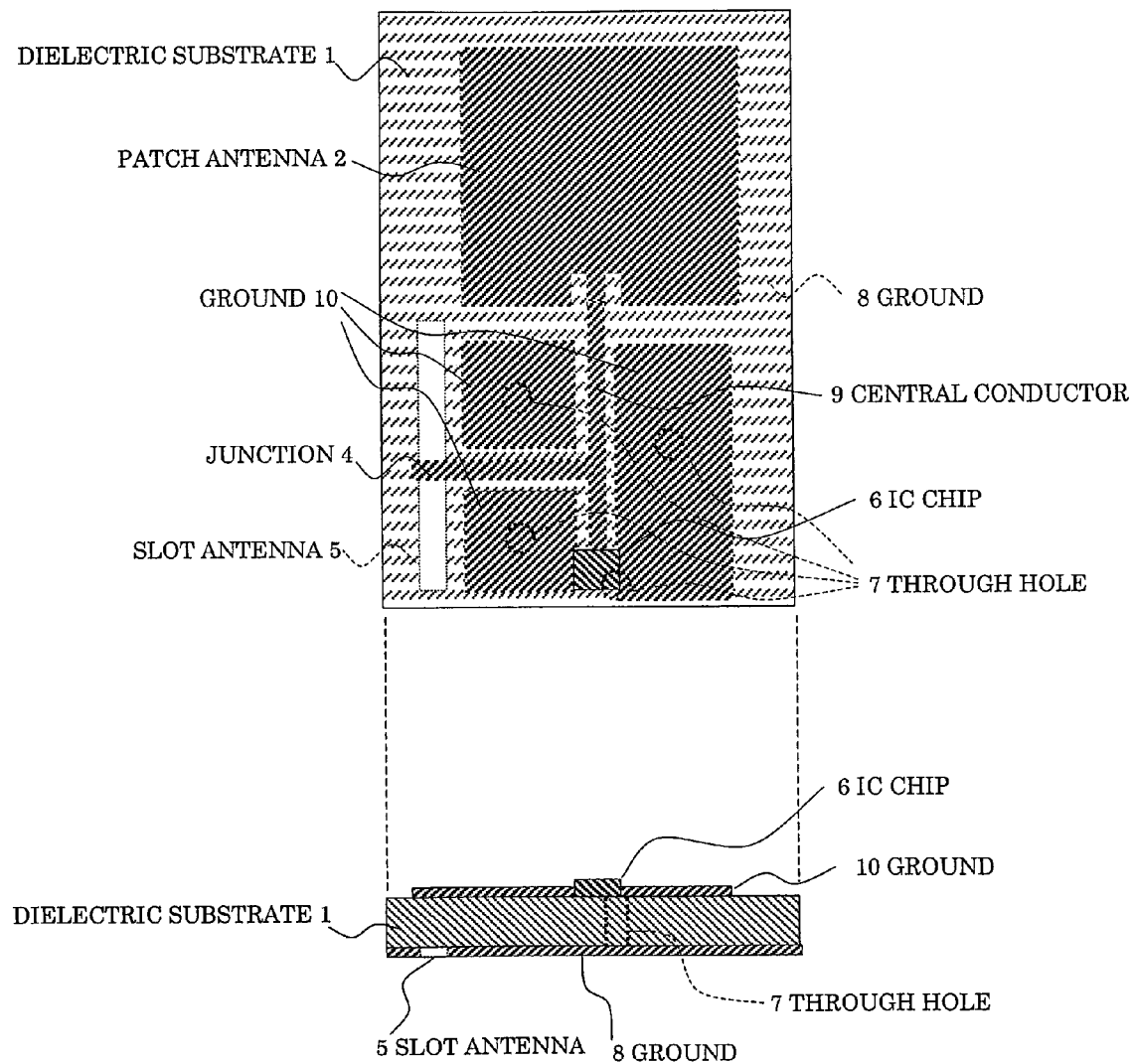
FIG. 3 is a diagram showing an embodiment (2) of a radio tag according to the present invention.
Figure 5:
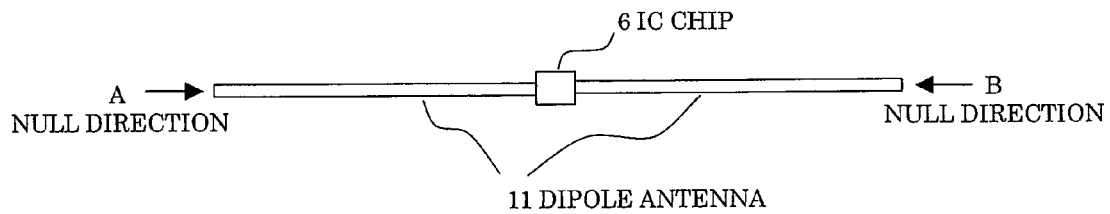
FIG. 5 is a diagram showing a prior art radio tag using a planar circuit type dipole antenna.

FIG. 3 shows an RFID tag 200 as an embodiment (2) of the present invention where a feeder is composed of a coplanar line. This RFID tag 200 is different from the RFID tag 100 of the above-mentioned embodiment (1) in that the RFID tag 200 shown in FIG. 3 uses a coplanar line composed of a central conductor 9 and a ground 10 substituted for the microstrip line 3 in the RFID tag 100 shown in FIG. 1. Also, the ground 10 of the coplanar line and the ground 8 corresponding to the patch antenna 2 are made the same electrical potential through the through hole 7.

When the feeder is the microstrip line 3 as in the above-mentioned embodiment (1), the characteristic impedance of the feeder is determined by a relative permittivity $\in_r$ and a thickness "t" of the dielectric substrate 1, and a width of the microstrip line 3 is in a proportional relationship with the thickness "t" of the dielectric substrate 1. Therefore, if the dielectric substrate 1 is thin, the width of the microstrip line 3 is required to be narrowed. However, there is a problem that when the width of the microstrip line 3 is too narrow, the feeding loss becomes large.

In contrast, when a coplanar line is used as in the embodiment (2), the characteristic impedance of the feeder is determined by a ratio of a width of the central conductor 9 to a distance between the ground 10 on both sides, independently of the thickness "t" of the dielectric substrate 1. Therefore, even if the dielectric substrate is very thin, it is possible to reasonably set the line width of the central conductor 9 so that the feeding loss may not become too large. Thus, the design convenience is improved when the coplanar line is used.

As in the above-mentioned RFID tag 100 of the embodiment (1), the directivity of electric wave transmission/reception in the RFID tag 200 of the embodiment (2) is also improved compared with the prior art when the object to which the tag is attached is a nonmetal.

Comparison Between Prior Art Example and Present Invention

FIG. 4 shows a comparison table summarizing attachability/non-attachability and directivity when the prior art RFID tag 400 and the RFID tags 100 and 200 of the present invention are respectively attached to a metal and a nonmetal, where the attached surface is made the surfaces of the ground 8 and the patch antenna 2.

As is clear from FIG. 4, there is no difference between the prior art RFID tag 400 and the RFID tags 100, 200 of the present invention with regard to the attachability/non-attachability whether the tags are attached to the metal or the nonmetal.

Namely, to the metal, only the surface of the ground 8 can be attached, while to the nonmetal, both of the surfaces of the ground 8 and the patch antenna 2 are attachable.

Also, when the tags are attached to the metal, the directivities are the same for the prior art RFID tag 400 and the RFID tags 100 and 200 of the present invention.

Namely, the directivity when the surface of the ground 8 is attached to the metal is as shown in FIG. 7A, so that only the signal S1 can be received. It is to be noted that when the patch antenna 2 is attached to the metal, both of the signals S1 and S2 cannot be received as shown in FIG. 7B.

As for the directivities when the tags are attached to the nonmetal, the prior art RFID tag 400 can receive only the signal S1 as shown in FIG. 7C when the surface of the ground 8 is attached thereto, while on the contrarily, it can receive only the signal S2 as shown in FIG. 7D when the surface of the patch antenna 2 is attached thereto.

In contrast, with the RFID tags 100 and 200 of the present invention, both of the signals S1 and S2 can be received as shown in FIGS. 2A and 2B even when either of the surfaces of the ground 8 and the patch antenna 2 is attached to the nonmetal.

As described above, the radio tag according to the present invention is one for both of a metal and a nonmetal which can largely improve the directivity of the electric wave transmission/reception when attached to a nonmetallic object.

What is claimed is:

1. A radio tag comprising:
   a single patch antenna arranged on one surface of a dielectric substrate;
   a single slot antenna formed integrally with a ground plane arranged on the other surface of the dielectric substrate; and
   a microstrip line or coplanar line as a feeder having a part connecting the patch antenna to an IC chip and a part extending from a branching point in the line to a junction for electromagnetic coupling with the slot antenna;
   the single slot antenna being displaced from the single patch antenna such that radiation from the slot antenna is not disturbed by the patch antenna.

2. The radio tag as claimed in claim 1, wherein frequencies of electric wave signals transmitted and received by the patch antenna and the slot antenna are same.

3. The radio tag as claimed in claim 1, wherein the IC chip is placed on the same surface as the patch antenna and connected to the ground plane through a through hole provided in the dielectric substrate.

4. The radio tag as claimed in claim 3, wherein the microstrip line or coplanar line is placed on the same surface as the patch antenna and connected electromagnetically to the slot antenna through a noncontact feeding portion.

* * * * *